(12) United States Patent
Chou et al.

(10) Patent No.: US 8,497,183 B2
(45) Date of Patent: Jul. 30, 2013

(54) DEVICES HAVING A CAVITY STRUCTURE AND RELATED METHODS

(75) Inventors: You-Hua Chou, Taipei (TW); Hsiang Hsiang Ko, Tainan County (TW); Hung Jui Chang, Changhua County (TW); Yi Ming Chen, Tainan (TW); Hsien-Wei Lin, Tainan (TW)

(73) Assignee: Taiwan Semiconductor Manufacturing Company, Ltd., Hsin-Chu (TW)

(*) Notice: Subject to any disclaimer, the term of this patent is extended or adjusted under 35 U.S.C. 154(b) by 171 days.

(21) Appl. No.: 12/662,681

(22) Filed: Apr. 28, 2010

(65) Prior Publication Data
US 2010/0255187 A1  Oct. 7, 2010

Related U.S. Application Data

(62) Division of application No. 11/402,906, filed on Apr. 13, 2006, now abandoned.

(51) Int. Cl.
*H01L 21/76* (2006.01)
(52) U.S. Cl.
USPC .............. 438/422; 438/411; 438/421

(58) Field of Classification Search
USPC ............ 438/319, 411, 421, 422; 257/758
See application file for complete search history.

(56) References Cited

U.S. PATENT DOCUMENTS

| | | | |
|---|---|---|---|
| 5,098,856 | A | 3/1992 | Beyer et al. |
| 5,750,415 | A | 5/1998 | Gnade et al. |
| 6,376,893 | B1 | 4/2002 | Rha |
| 6,727,157 | B2 | 4/2004 | Seo |
| 2002/0117104 | A1 | 8/2002 | Hata et al. |

*Primary Examiner* — Ori Nadav
(74) *Attorney, Agent, or Firm* — Finnegan, Henderson, Farabow, Garrett & Dunner, LLP

(57) ABSTRACT

A method of making a device. The method comprises providing a first layer including a first material on a surface of a substrate, removing a portion of the first layer and a corresponding portion of the substrate to form an opening in the first layer and a recessed portion in the surface of the substrate, and supplying a liquid mixture to the opening and the recessed portion. The liquid mixture includes a first component having a first chemical affinity to the first material and a second component having a second chemical affinity to the first material, which is smaller than the first chemical affinity. The method also includes removing the second component and forming a second layer including the first component. The second layer covers the recessed portion and adheres to an edge portion of the first layer, such that the second layer and the recessed portion define a cavity.

5 Claims, 20 Drawing Sheets

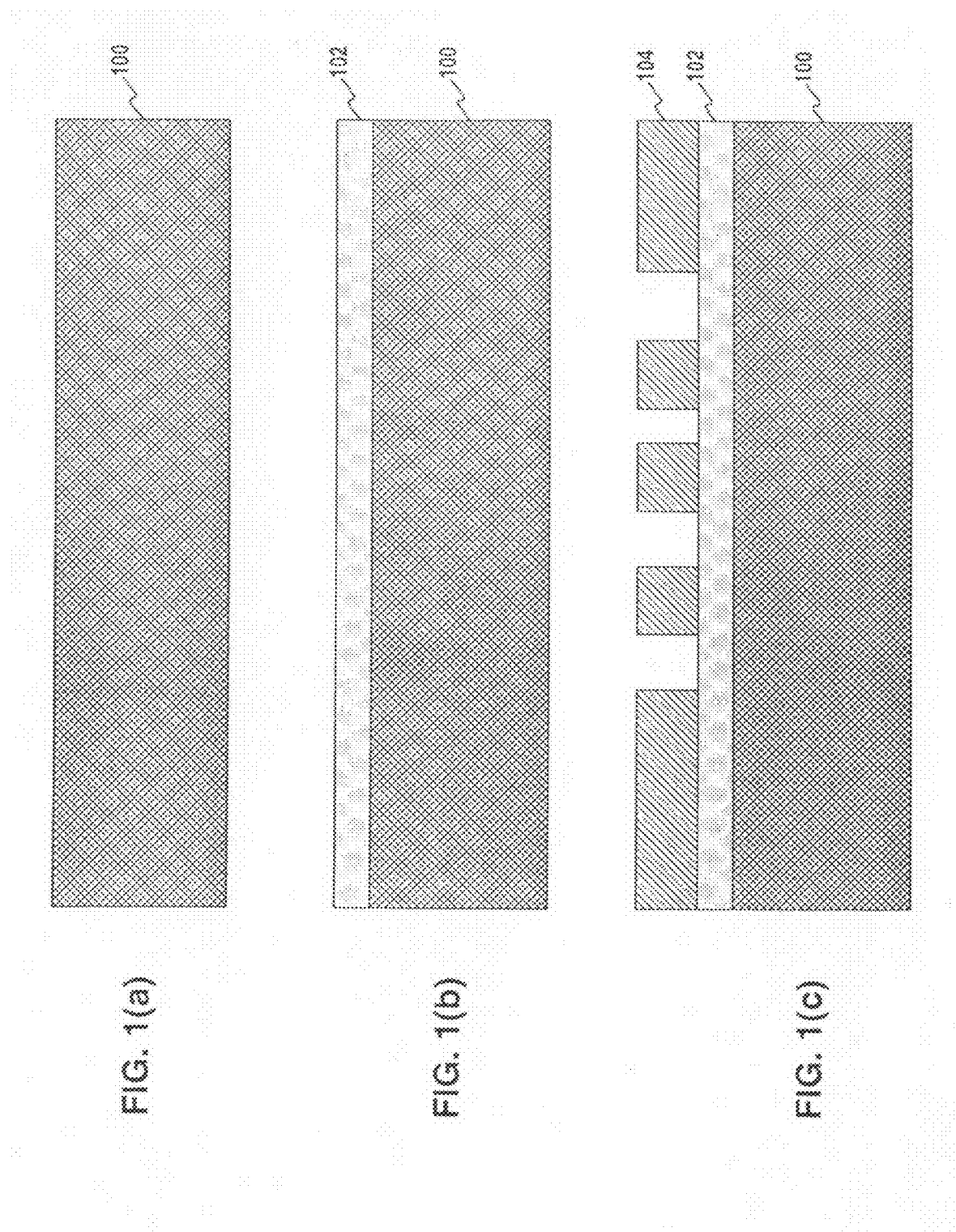

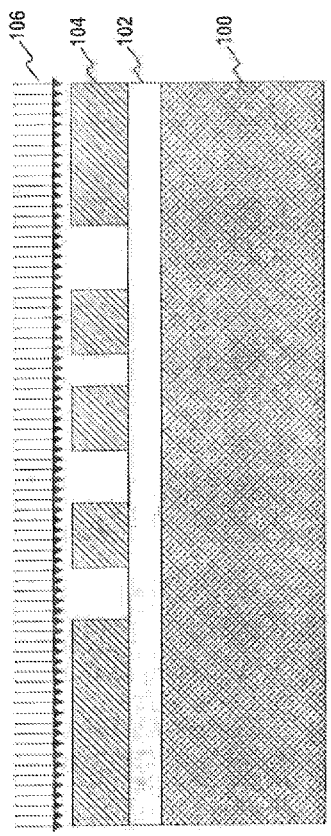
FIG 1(d)
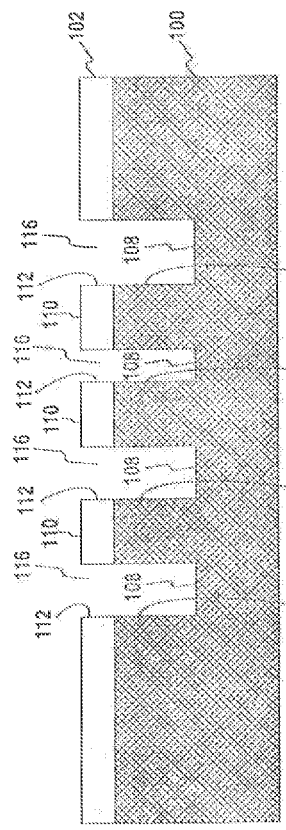
FIG 1(e)
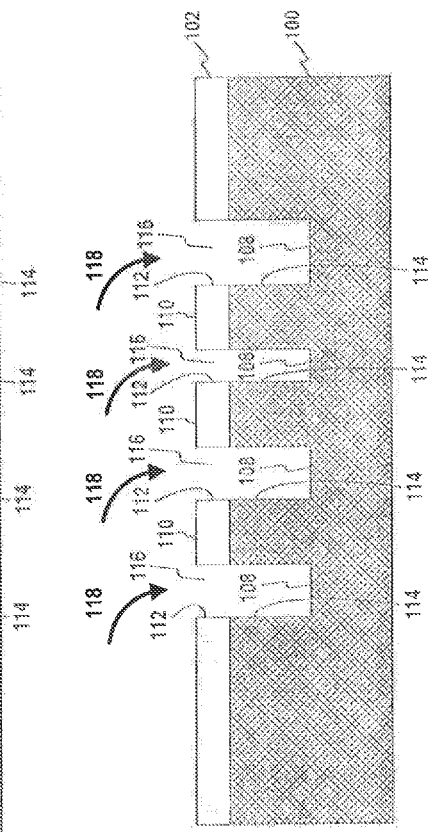
FIG 1(e')

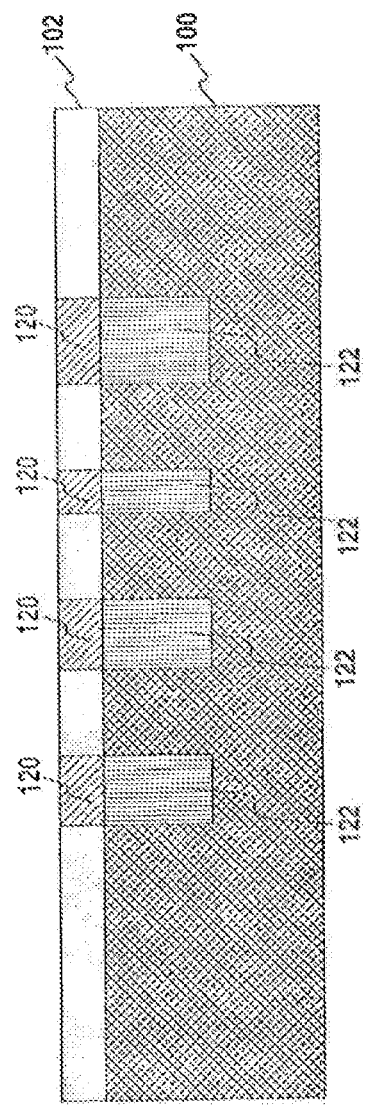

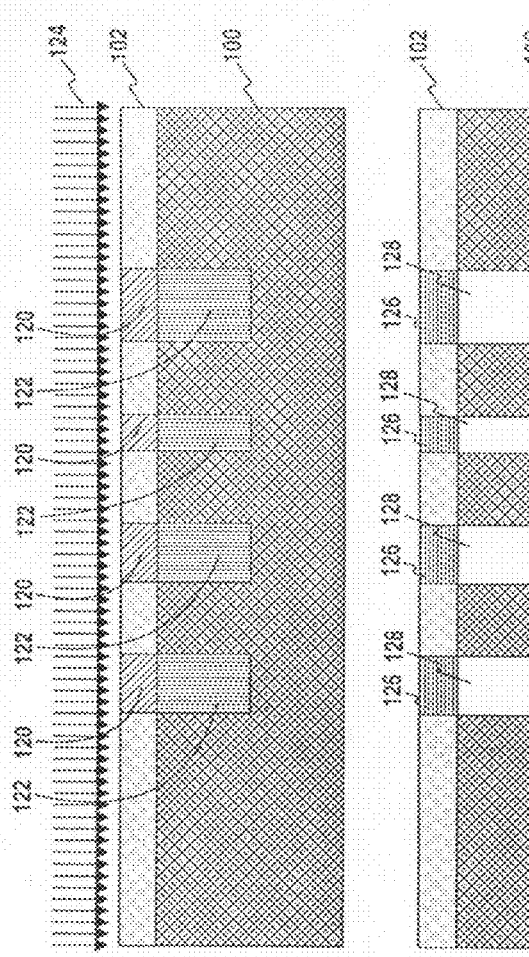
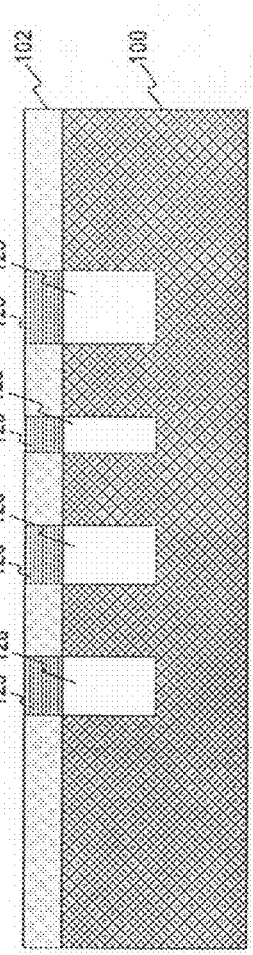
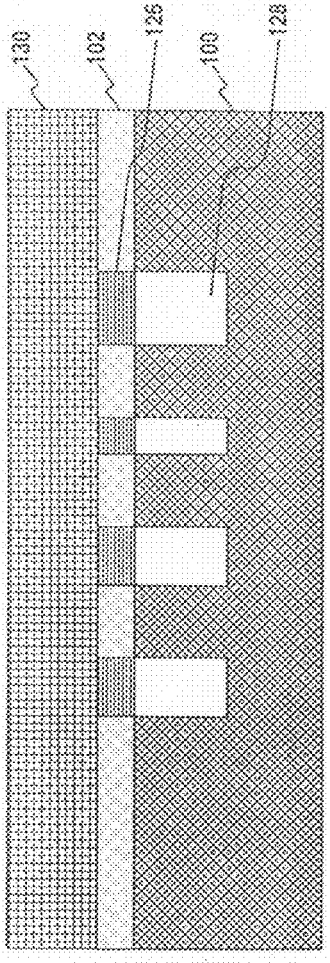
FIG 1(g)
FIG 1(h)
FIG 1(i)

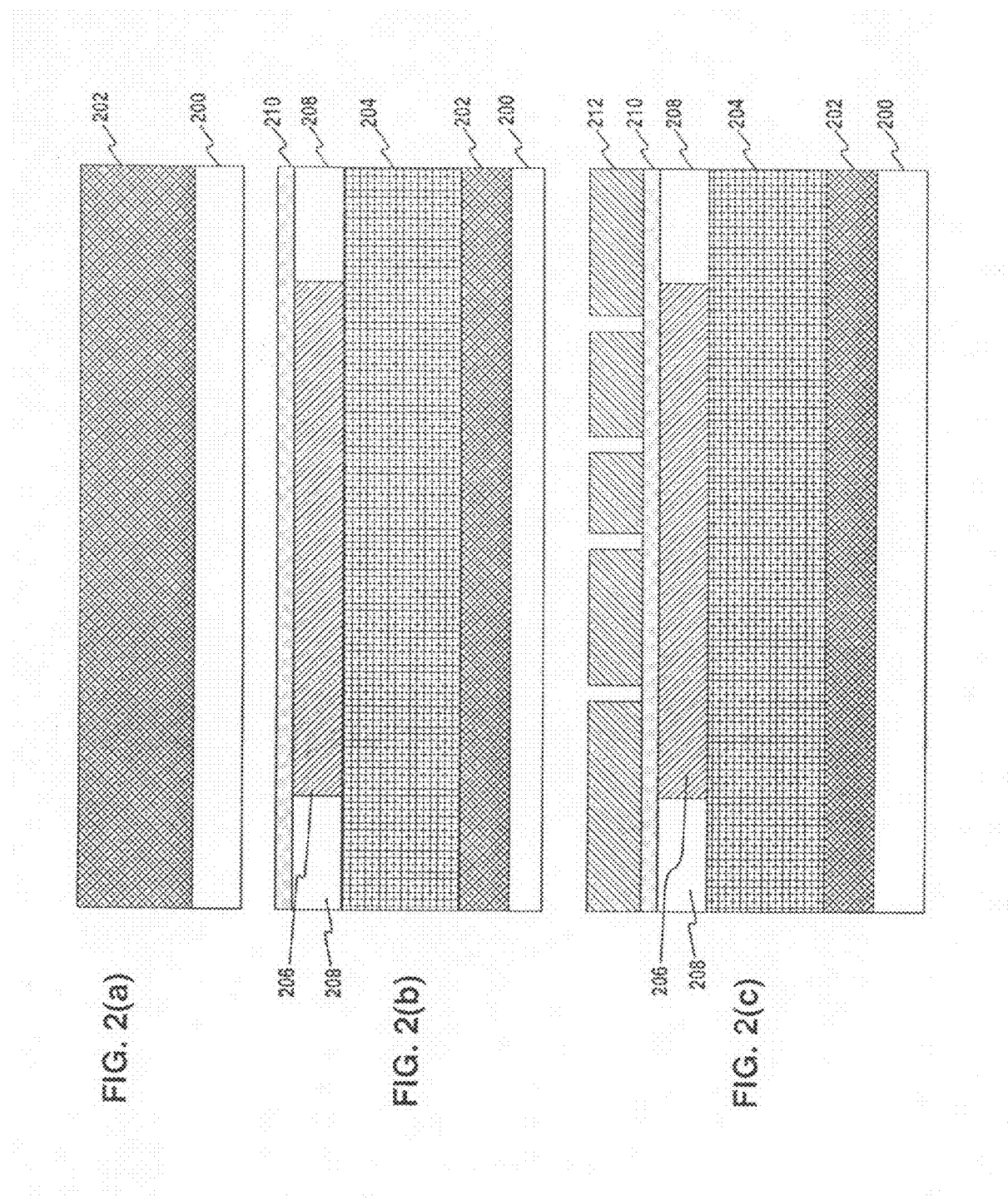

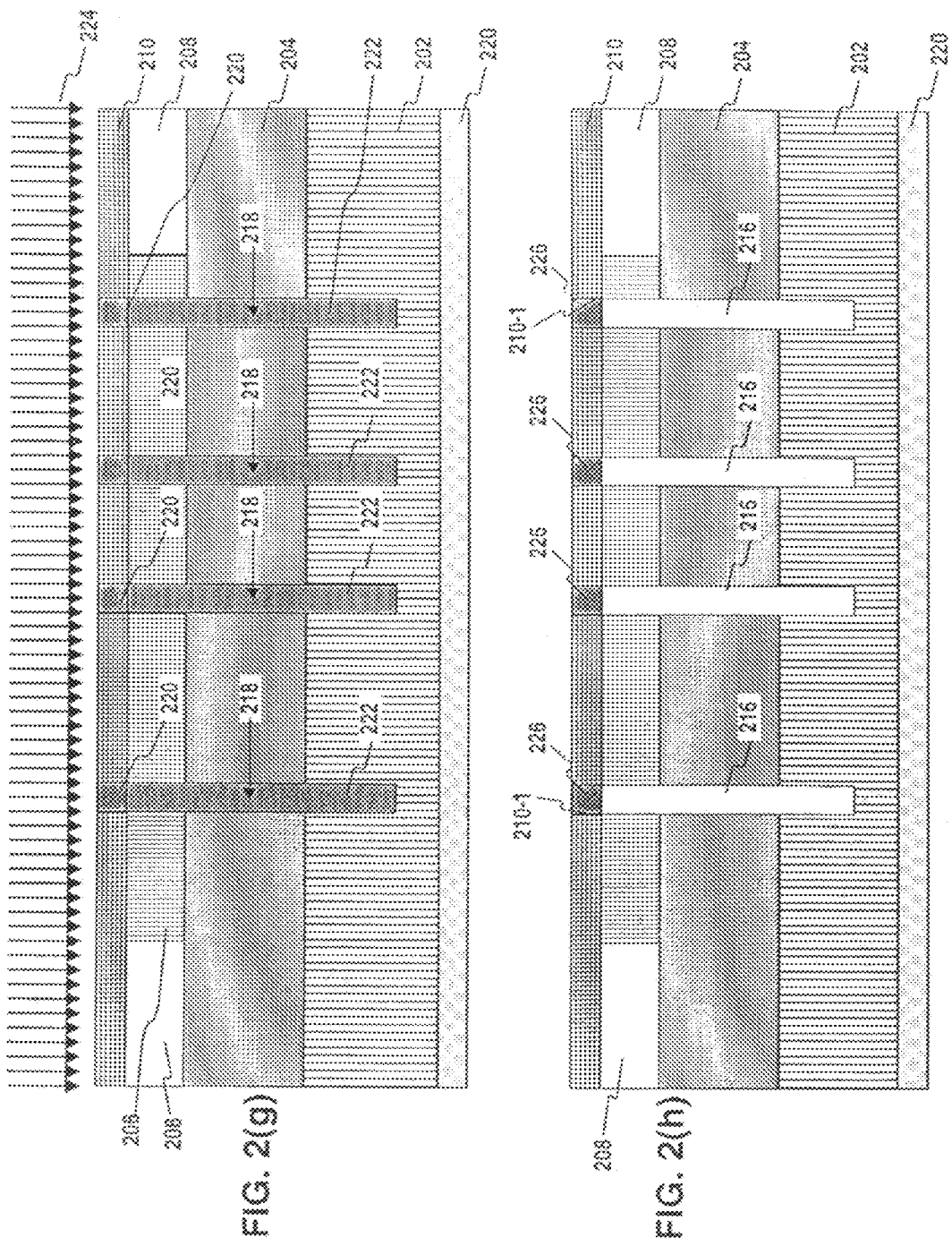

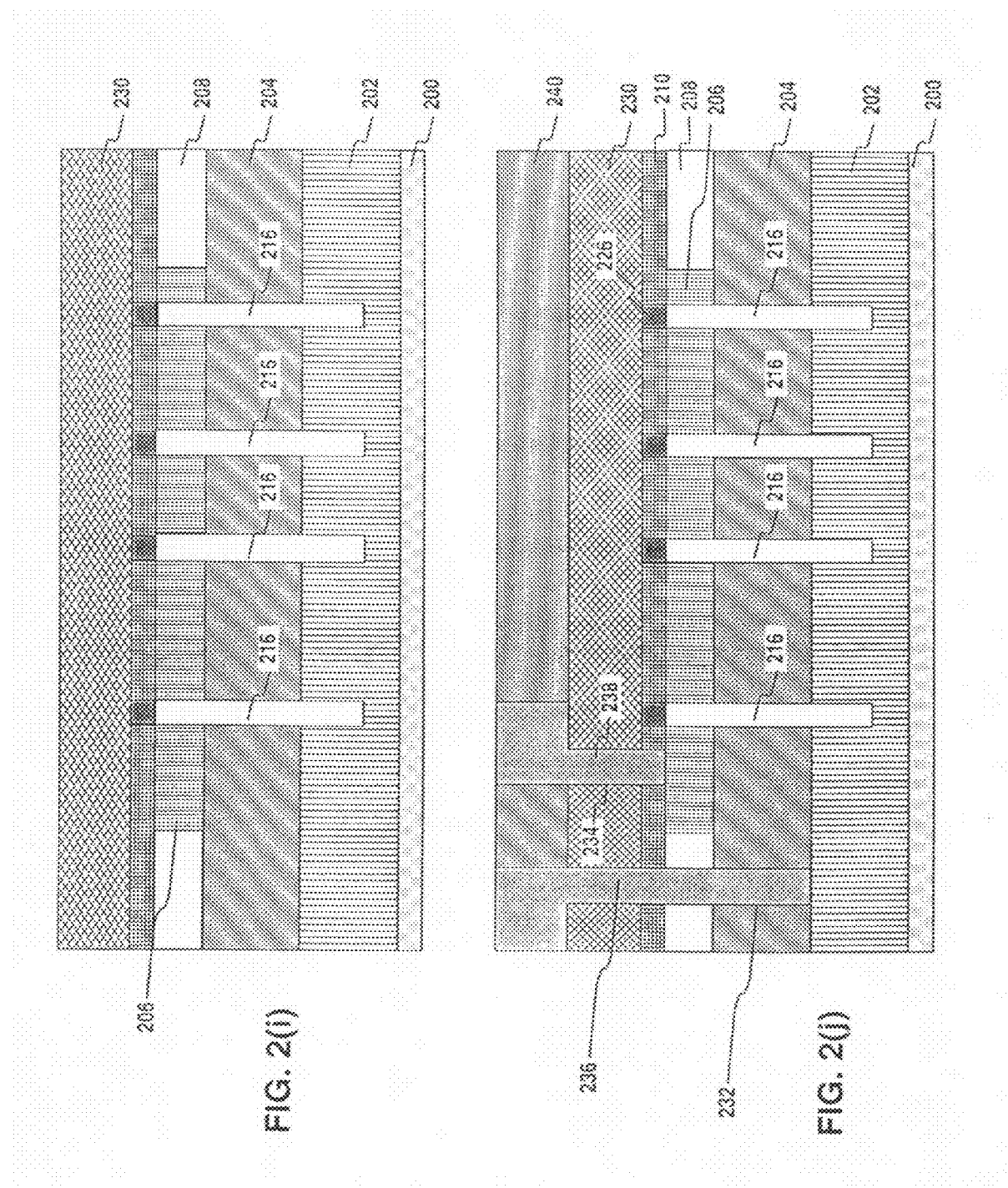

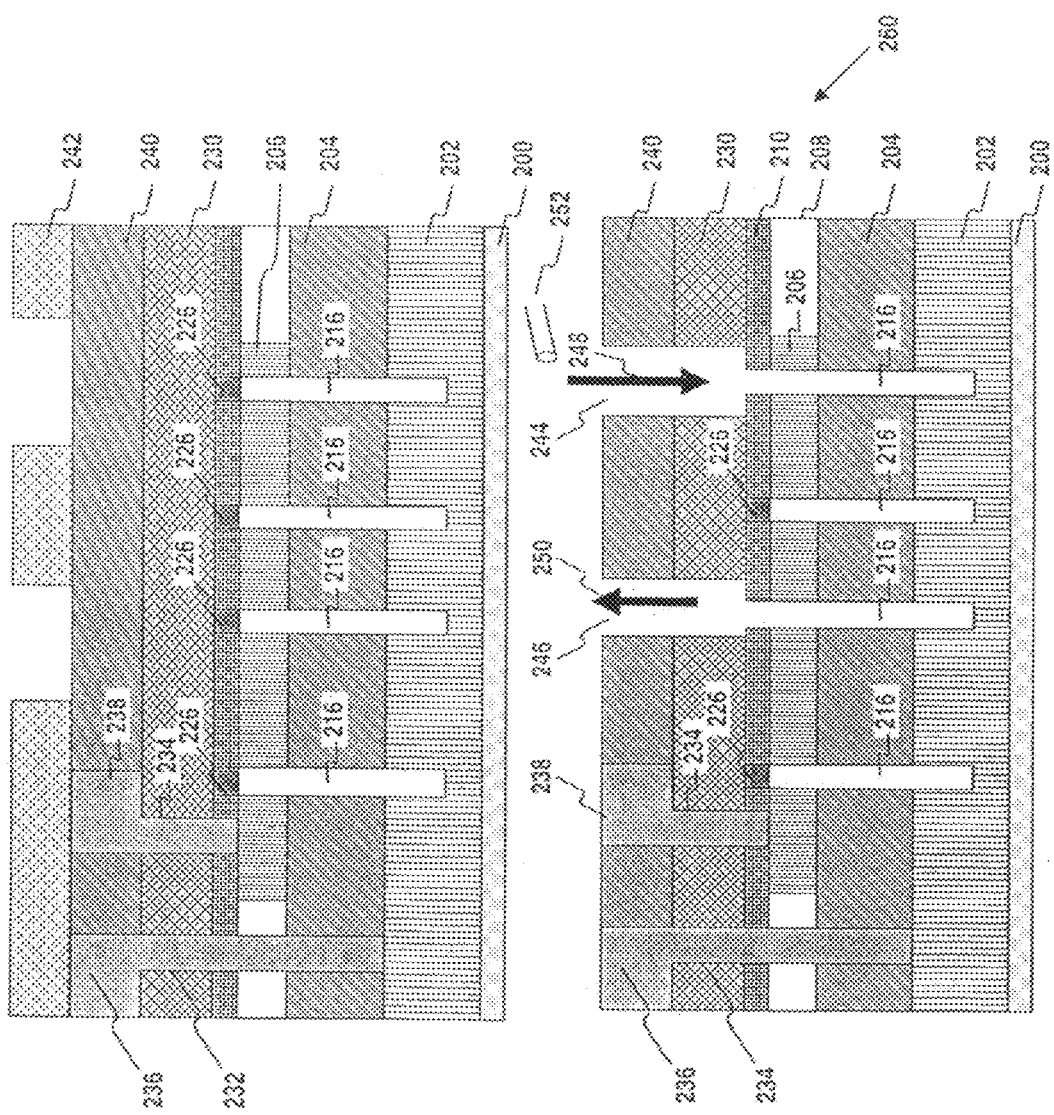

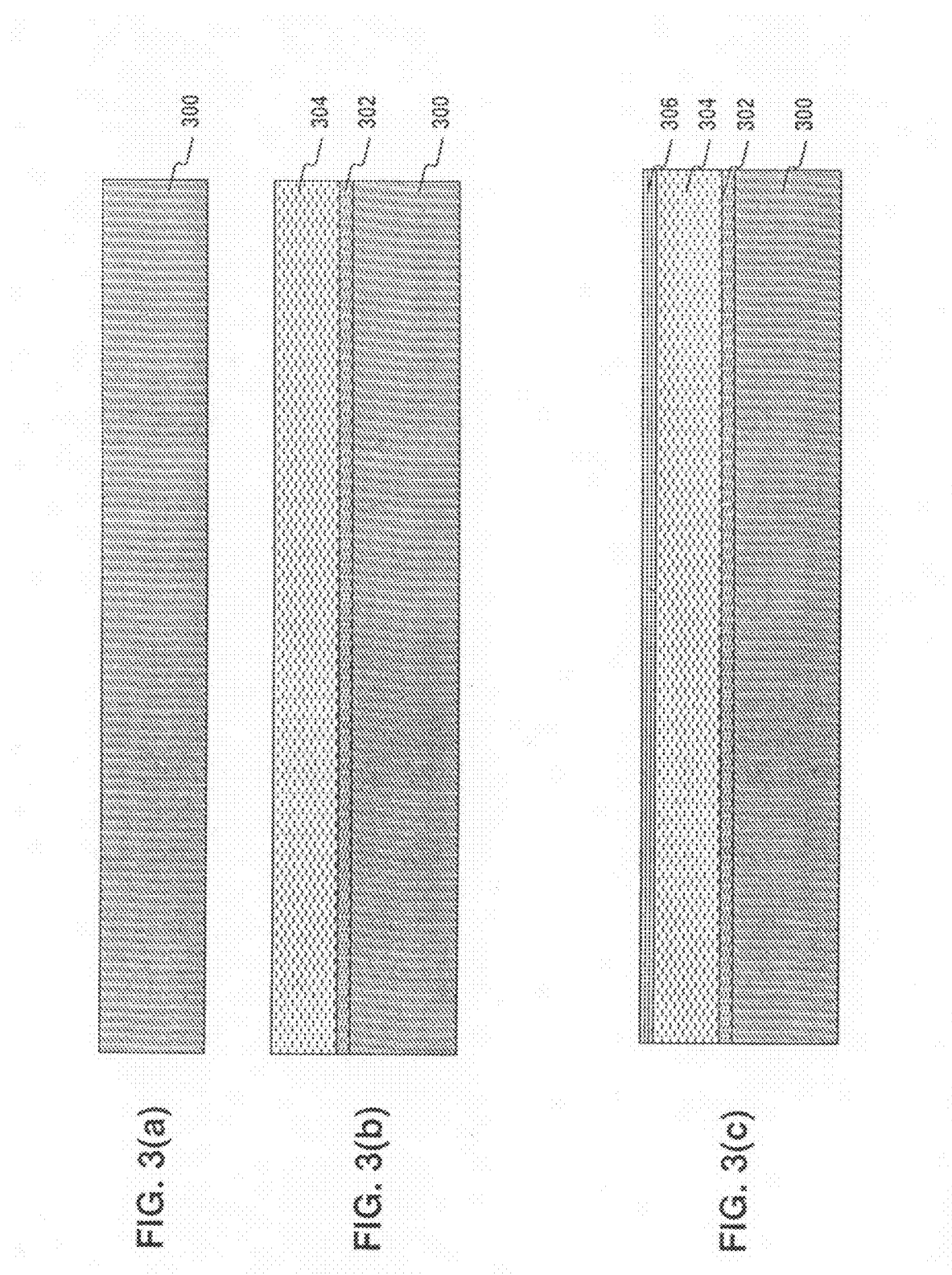

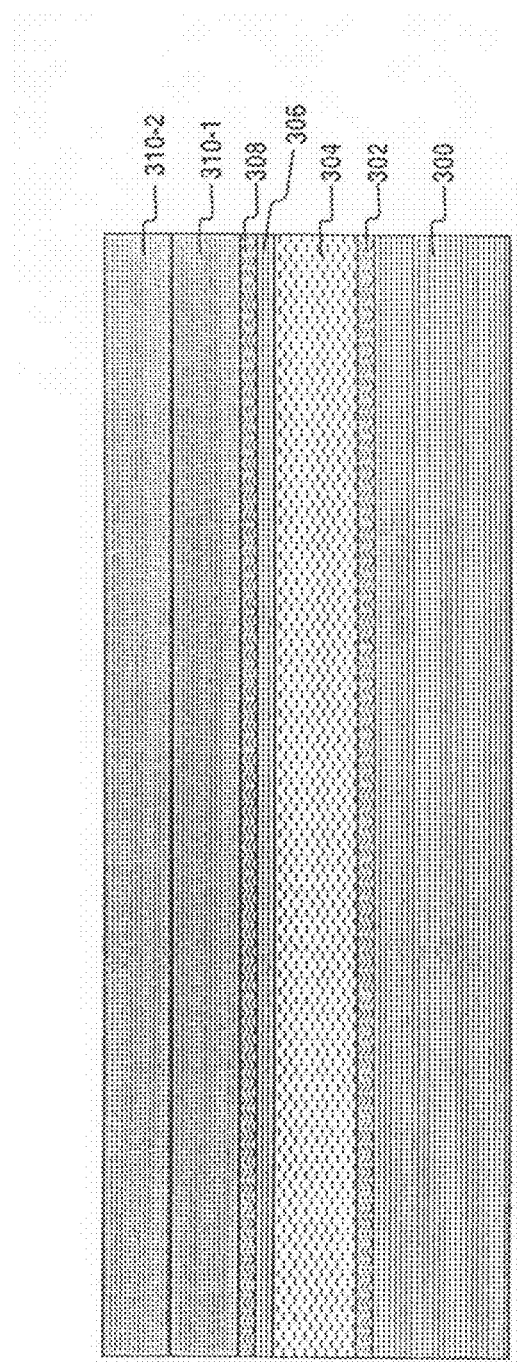
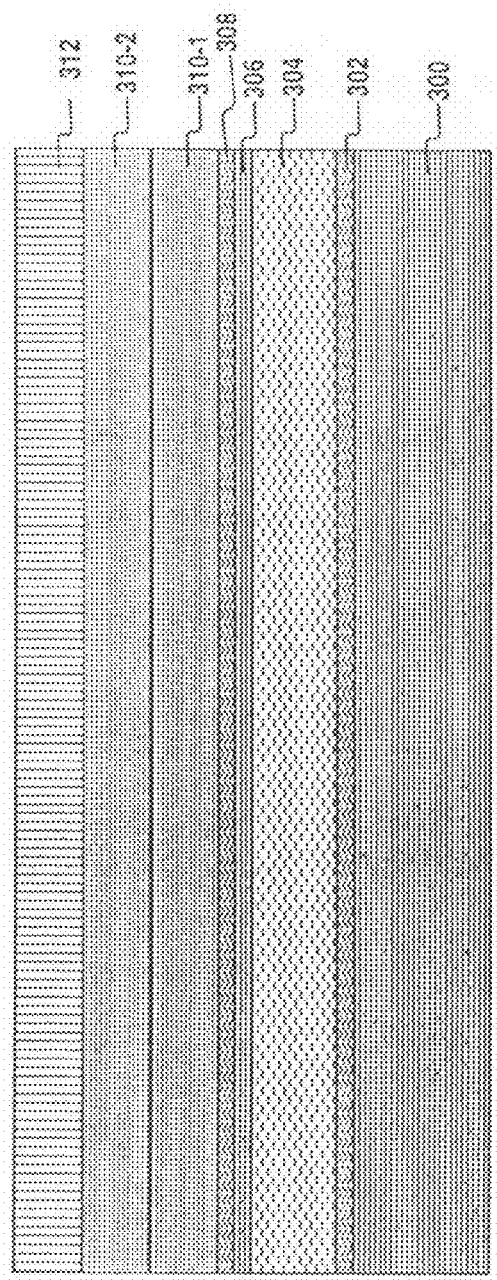
FIG. 3(d)
FIG. 3(e)

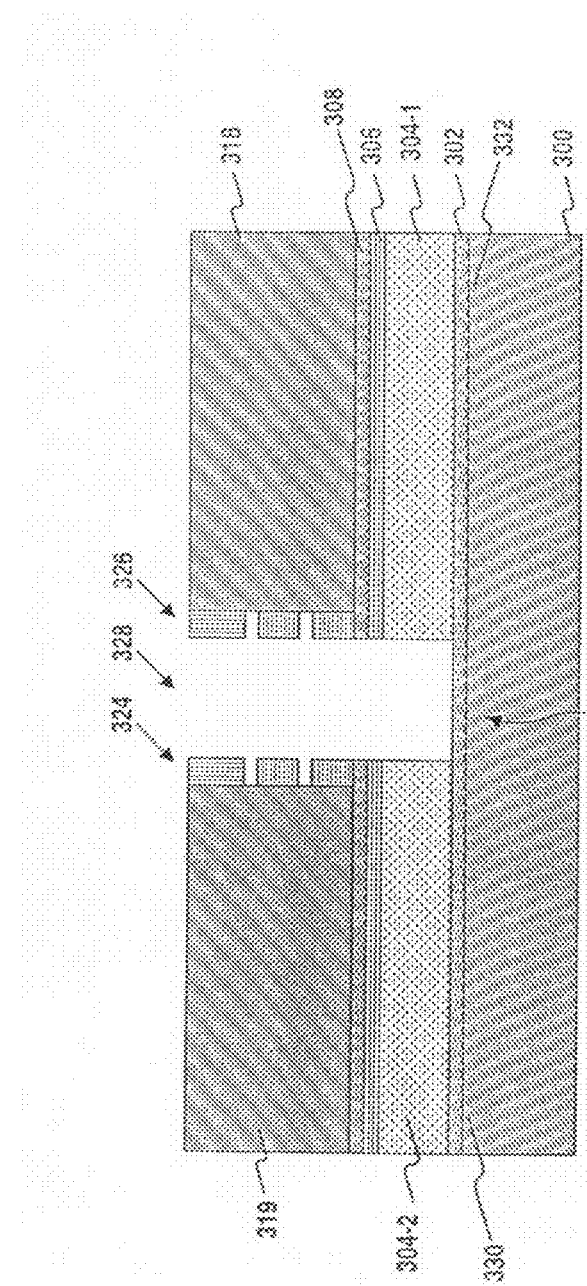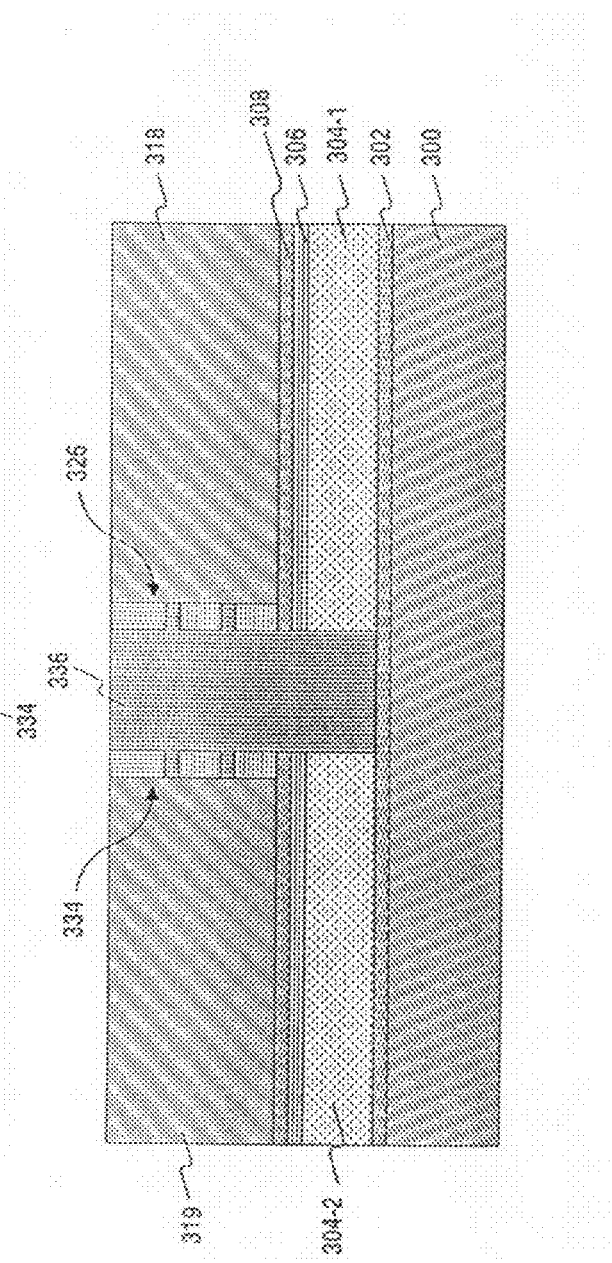

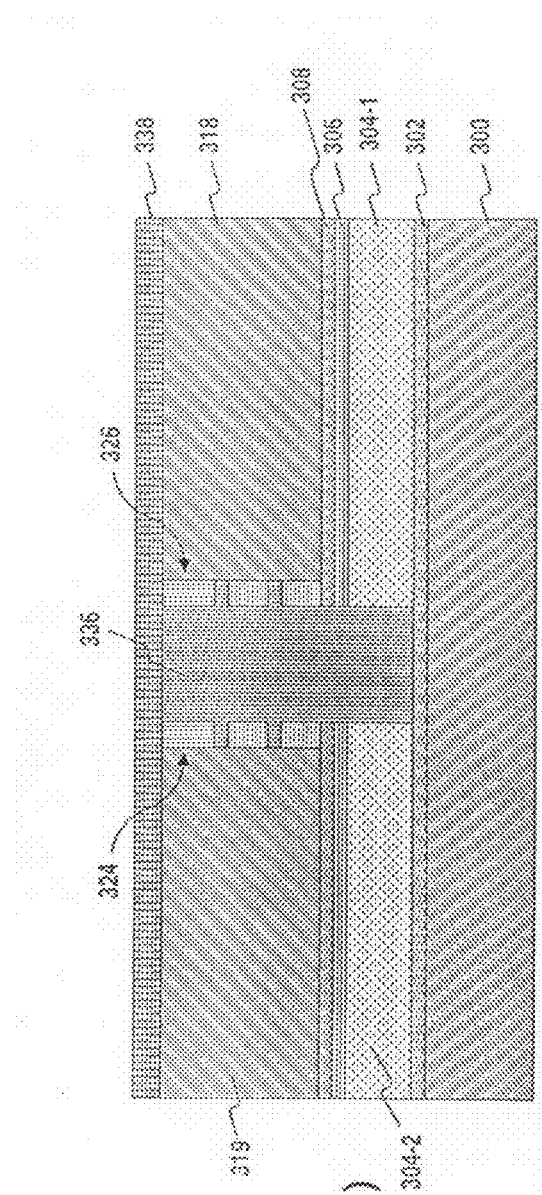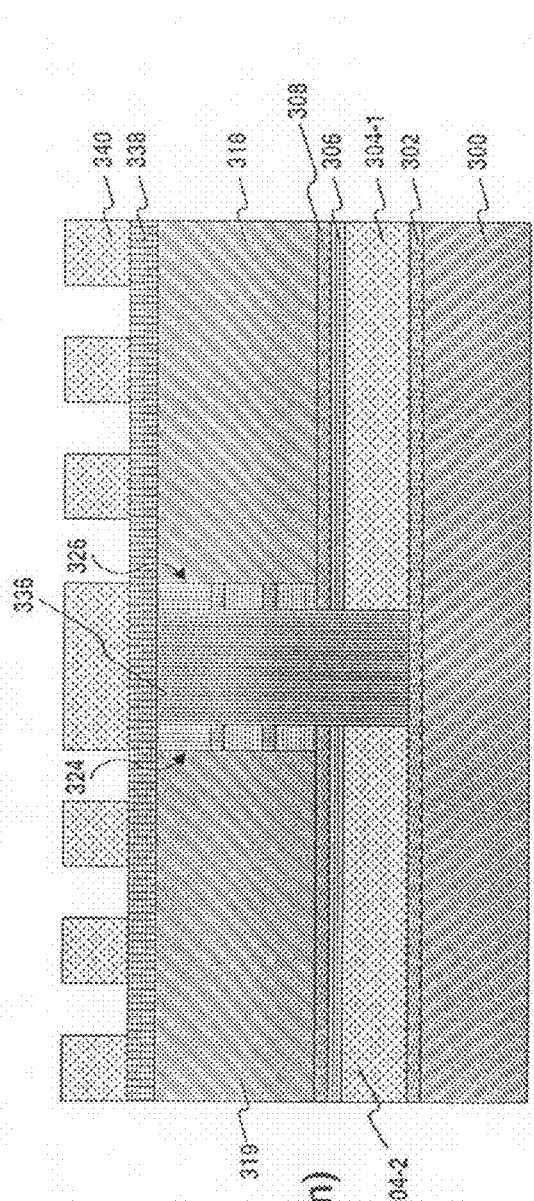

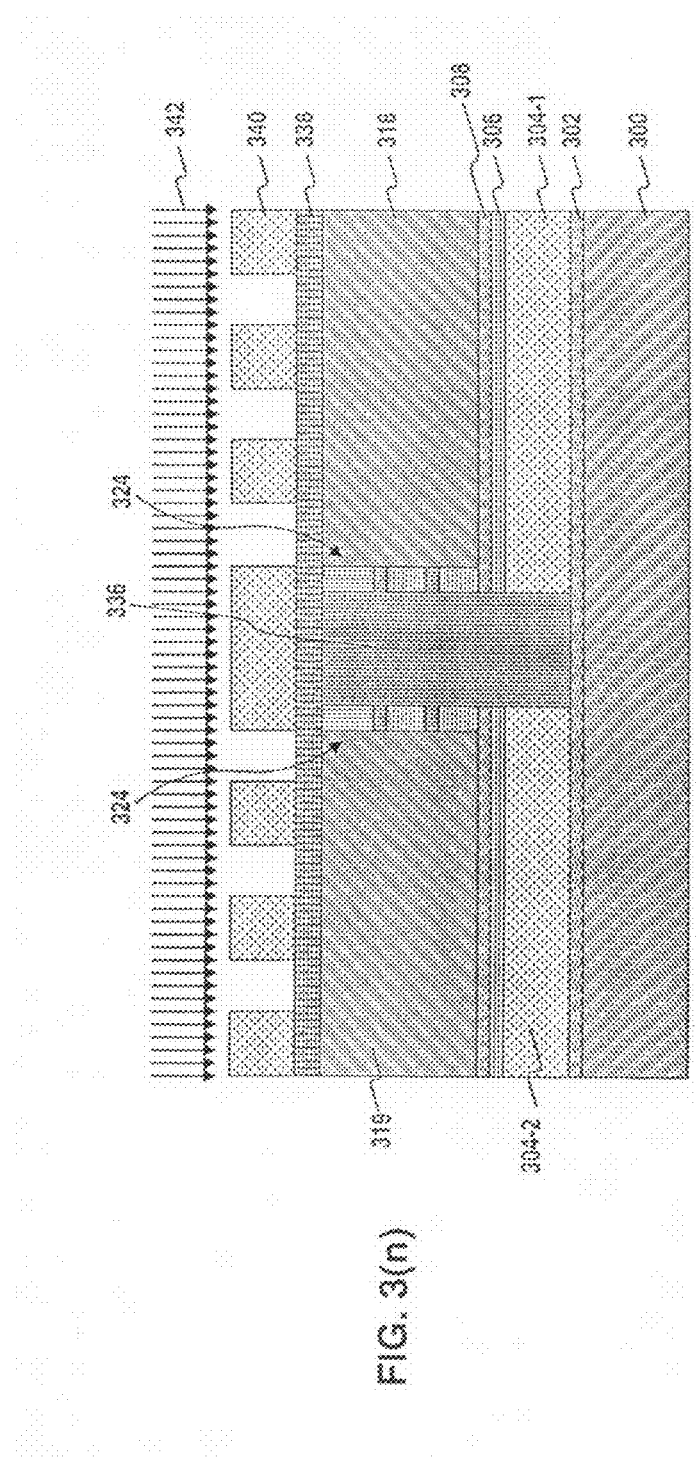
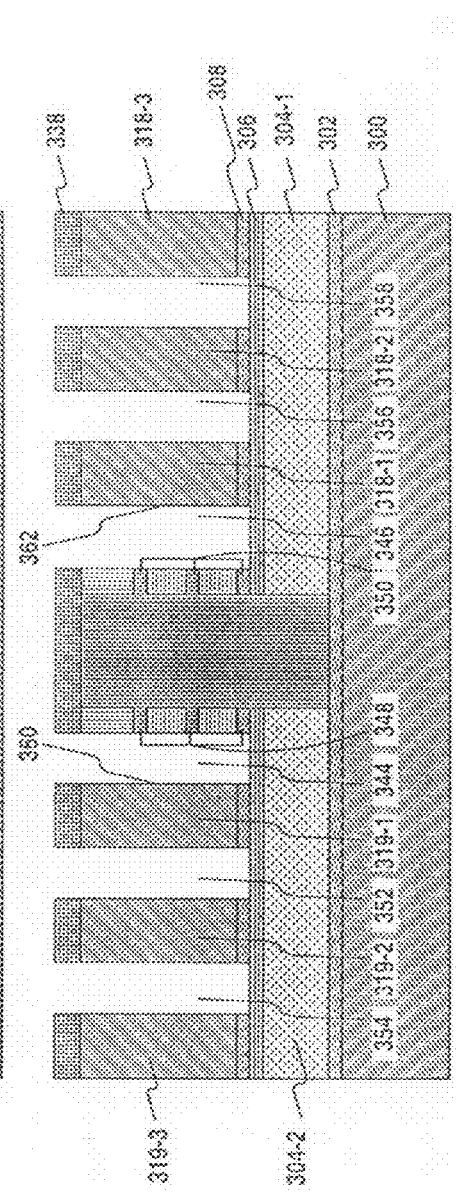
FIG. 3(n)
FIG. 3(o)

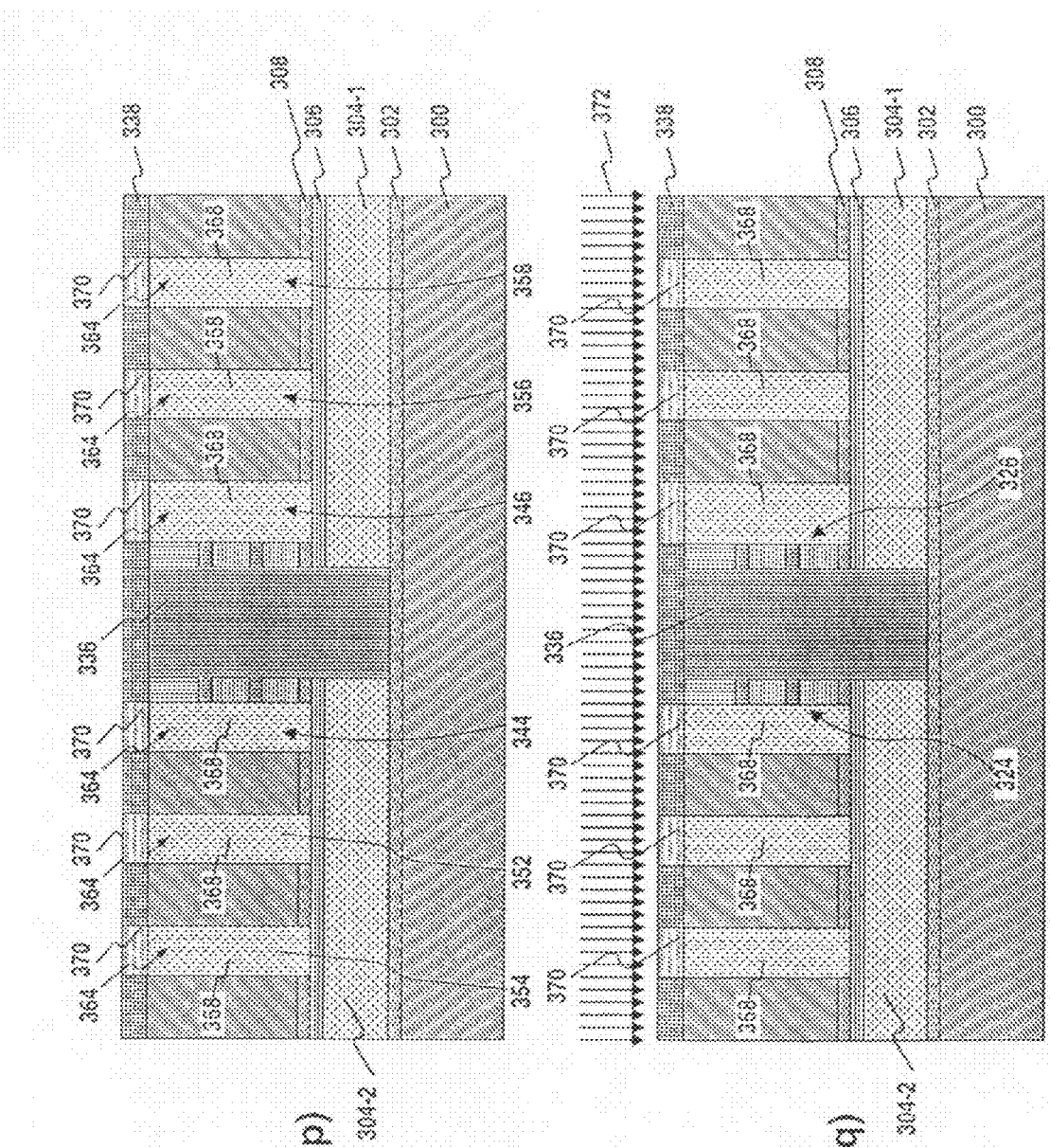

DEVICES HAVING A CAVITY STRUCTURE AND RELATED METHODS

RELATED APPLICATION

This is a division of application Ser. No. 11/402,906, filed Apr. 13, 2006, now abandoned, which is incorporated herein by reference.

BACKGROUND OF THE INVENTION

1. Field of the Invention

The present invention is directed toward devices and structures having a cavity formed therein and related methods.

2. Background of the Invention

Miniature devices and structures can be fabricated with conventional semiconductor processing techniques. These techniques typically involve depositions of insulative and conductive materials, as well as photolithography and etching steps, in a desired sequence. The resulting structure is thus a series of patterned layers, one on top of another.

Many different device structures can be fabricated with conventional semiconductor processing techniques. For example, in fabricating a memory cell capacitor, trenches may be formed in a substrate and then filled with a desired dielectric material. The top of a trench, however, often cannot simply be covered with a material to form a cavity or enclosed space, because the deposited material fills the bottom and coats the sides of the trench instead. Accordingly, device structures including cavities or enclosed spaces have been difficult to achieve with conventional semiconductor processing techniques. Such structures may be beneficial in obtaining capacitors and fuel cells, for example, having reduced size or improved performance.

SUMMARY OF THE INVENTION

Consistent with an aspect of the present invention, a device is provided which comprises a substrate having a recessed surface portion and a protruding surface portion spaced from the recessed surface portion. A first layer including a first material is provided on the protruding surface portion, and an edge portion of the first layer is aligned with an edge portion of the protruding surface portion. In addition, a second layer including a second material is provided over the recessed surface portion. The second layer has an edge portion contacting the edge portion of the first layer. The first material has a chemical affinity toward the second material such that the edge portion of the second layer adheres to the edge portion of the first layer, the second layer and recessed surface portion defining a cavity.

Consistent with an additional aspect of the present invention, a method of making a device is provided, which comprises providing a first layer including a first material on a surface of a substrate, and removing a portion of the first layer and a corresponding portion of the substrate to form an opening in the first layer and a recessed portion in the surface of the substrate. The method further comprises supplying a liquid mixture to the opening in the first layer and the recessed portion in the surface of the substrate. The liquid mixture includes a first component having a first chemical affinity to the first material and a second component having a second chemical affinity to the first material, the first chemical affinity being greater than the second chemical affinity. In addition, the method includes removing the second component and forming a second layer including the first component. The second layer covers the recessed portion and adheres to an edge portion of the first layer adjacent the opening in the first layer. The second layer and the recessed portion define a cavity.

Consistent with a further aspect of the present invention, an electronic device is provided which comprises a substrate. A first conductive layer is provided on the substrate, and an insulative layer is provided on the conductive layer. In addition, a second conductive layer provided on the insulative layer, and a first layer including a first material is provided on the second conductive layer. A cavity extends through the first layer, the first conductive layer, and the insulative layer. A second layer is also provided, such that an edge portion of the second layer contacts an edge portion of the first layer. The second layer includes a second material having a chemical affinity toward the first material so that the second layer adheres to the first layer. Further, a fluid, having a higher dielectric constant than a dielectric constant of the insulative layer, is provided in the cavity.

Consistent with an additional aspect of the present invention, a method of manufacturing an electronic device is provided in which a first conductive layer is provided on a substrate, and an insulative layer is provided on the first conductive layer. The method also includes providing a second conductive layer on the insulative layer, and providing a first layer including a first material on the second conductive layer. In addition, the method includes etching a portion of the first layer, a portion of the second conductive layer and a portion of the insulative layer to form a recessed region, and supplying a liquid mixture to the recessed region. The liquid mixture includes a first component having a first chemical affinity to the first material and a second component having a second chemical affinity to the first material, the first chemical affinity being greater than the second chemical affinity. Moreover, the method includes removing the second component, and forming a second layer including the first component. The second layer covers the recessed region and adheres to an edge portion of the first layer adjacent to the opening in the first layer. The second layer and the recessed region define a cavity. The method also includes supplying a dielectric liquid to the cavity, the dielectric fluid having a dielectric constant greater than a dielectric constant associated with the insulative layer.

Consistent with a further aspect of the present invention, a fuel cell is provided which comprises a substrate, as well as an anode electrode and a cathode electrode formed on first and second portions, respectively, of the substrate. A third portion of the substrate is provided between the first and second portions. A polymer electrolyte membrane is provided on the third portion of the substrate, and a first film having a sidewall surface is provided on the anode electrode. In addition, a second film having a sidewall surface is provided on the cathode electrode. A first porous layer is provided adjacent a first side of the polymer electrolyte membrane and is spaced from the sidewall surface of the first film, and a second porous layer is provided adjacent a second side of the polymer electrolyte membrane and is spaced from the sidewall surface of the second film. Moreover, a first recessed region is defined by the first porous layer and the sidewall of the first film, and a second recessed region is defined by the second porous layer and the sidewall of the second film. A first layer is provided on the first film, and a second layer is provided over the first recessed region. The second layer has a chemical affinity toward the first layer such that an edge portion of the second layer adheres to an edge portion of the first layer. Further, a third layer is provided on the second film, and a fourth layer is provided over the second recessed region. The fourth layer has a chemical affinity toward the third layer such that an edge portion of the fourth layer adheres to an edge portion of the second layer.

Consistent with another aspect of the present invention, a method of making a fuel cell is provided which comprises depositing a conductive layer on a substrate, and patterning the conductive layer to form an anode electrode and a cathode electrode. The method also includes providing a first porous layer on the anode electrode and a second porous layer on the cathode electrode, and providing a polymer electrolyte membrane between the first and second porous layer. In addition, the method includes depositing a film on the substrate about the first and second porous layers, and depositing a first layer including a first material on the film. The method further includes etching the film to form a first sidewall surface spaced from the first porous layer and a second sidewall surface spaced from the second porous layer. The first sidewall surface and the first porous layer define a first recessed region and the second sidewall surface and the second porous layer define a second recessed region. Moreover, the method includes etching the first layer to form a first opening in correspondence with the first recessed region and a second opening in correspondence with the second recessed region, and supplying a liquid mixture to the first and second recessed regions. The liquid mixture includes a first component having a first chemical affinity to the first material and a second component having a second chemical affinity to the first material less than the first chemical affinity. The method also includes removing the second component to form a second layer over the first recessed region and a third layer over the second recessed region such that an edge of the second layer adheres to a first edge of the first layer and an edge of the third layer adheres to a second edge of the first layer.

It is to be understood that both the foregoing general description and the following detailed description are exemplary and explanatory only and are not restrictive of the invention, as claimed.

The accompanying drawings, which are incorporated in and constitute a part of this specification, illustrate embodiments of the invention and together with the description, serve to explain the principles of the invention.

BRIEF DESCRIPTION OF THE DRAWINGS

FIGS. 1(*a*)-1(*i*) illustrate process steps in manufacturing a device consistent with an aspect of the present invention;

DESCRIPTION OF THE PREFERRED EMBODIMENTS

Figures 2D, 2E, 2F:
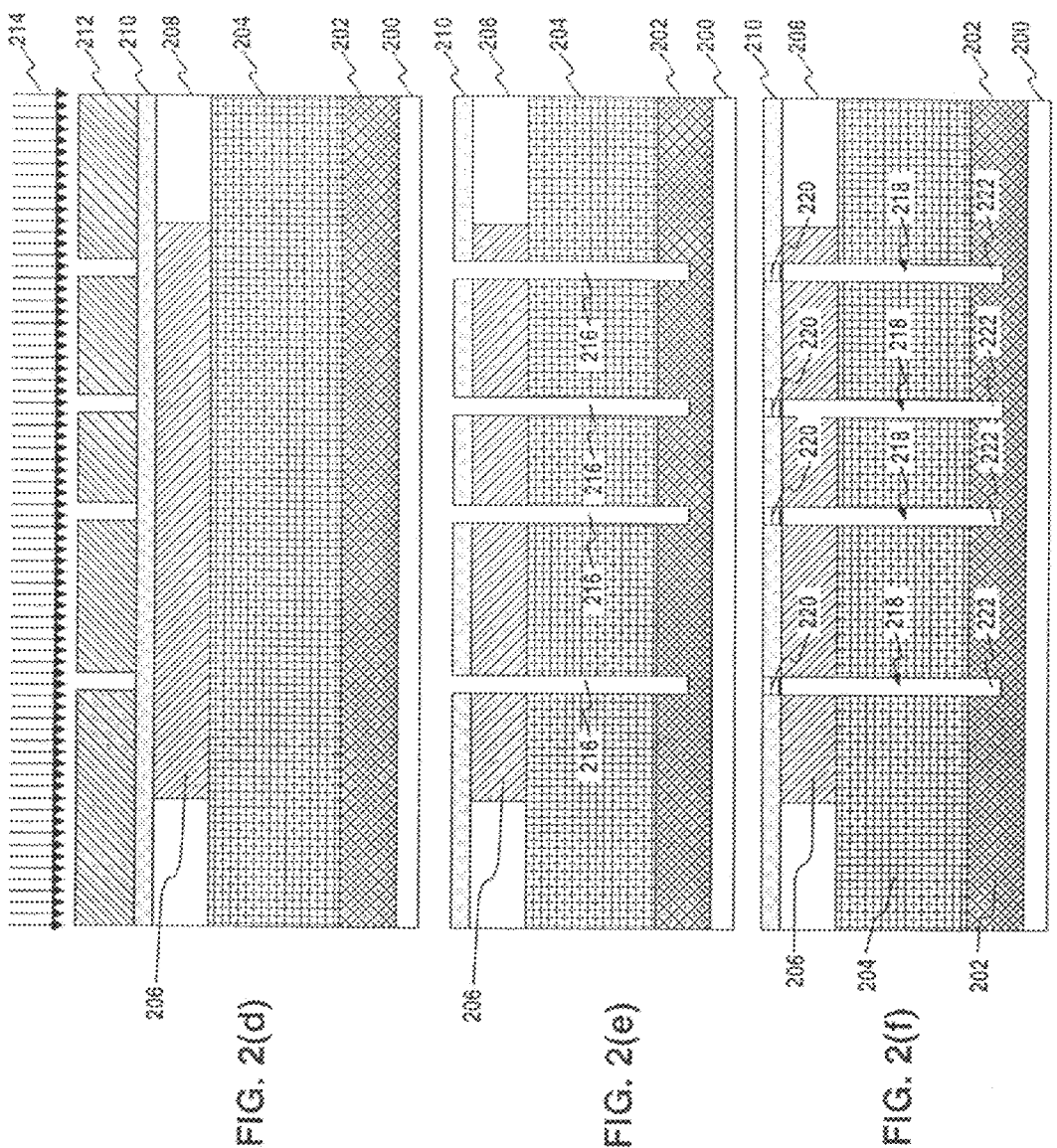
FIGS. 2(*a*)-2(*l*) illustrate process steps in manufacturing a capacitor consistent with an additional aspect of the present invention.

A structure having a cavity or enclosed space is fabricated by forming a recessed region in a surface of a substrate, and providing a trap or first layer adjacent the recessed region. A liquid mixture including first and second components is supplied to the recessed region. The first component has a higher chemical affinity to the trap layer than the second component such that the first component separates from the second component and adheres to an edge portion of the trap layer. The substrate may then be heated, and the second component is removed from the recessed region through evaporation. As a result, the first component remains as a dried film or second layer adhering to the edge portion of the trap layer and covering the recessed region, thereby defining a cavity or enclosed space within the recessed region. Structures including such cavities may be employed to realize a capacitor having a fluid, as opposed to solid, dielectric material, thereby increasing the capacitance of the capacitor. Alternatively, such cavities may confine the flow of gases within narrow grooves of a substrate to realize a fuel cell having reduced size.

Reference will now be made in detail to the present exemplary embodiments of the invention, examples of which are illustrated in the accompanying drawings. Wherever possible, the same reference numbers will be used throughout the drawings to refer to the same or like parts.

FIGS. 1(*a*)-1(*i*) illustrate process steps in manufacturing a device 140 (see FIG. 1(*i*)) consistent with an aspect of the present invention. As seen in FIG. 1(*a*), a substrate 100 is first provided, upon which a first layer 102 is deposited (FIG. 1(*b*)). First layer 102, also referred to herein as a trap layer, may include a first material, such as silicon nitride (SiN), fluorine doped silicate glass, silicon oxynitride, an organo-metallic compound, silicon carbide (SiC). First layer 102 may be deposited by chemical vapor deposition or by any other conventional process. A photoresist layer 104 is next provided on first layer 102, and then patterned, as shown in FIG. 1(*c*). Reactive ion etching or other conventional etching, as represented by arrows 106, is next carried out (FIG. 1(*d*)) to form openings 116 in first layer 102. Such etching also results in recessed surface portions 108, and protruding surface portions 110 of substrate 100 (FIG. 1(*e*)). In addition, edge portions 112 of first layer 102 are aligned with edge portions 114 of protruding surface portions 110.

In FIG. 1(*e'*), a liquid mixture 118 is supplied to each of recessed surface portions 108. Liquid mixture 118 includes a first component 120 having a first chemical affinity to first layer 102 and a second component 122 having a second chemical affinity to first layer 102. The first chemical affinity is typically greater than the second chemical affinity such that first component 120 separates from second component 122 in mixture 118 and adheres to edge portions 112 of first layer 102, as shown in FIG. 1(*f*). By way of example, first layer 102 may be hydrophilic, in which case first component 120 is preferably also hydrophilic and second component 122 is hydrophobic. Alternatively, first layer 102 may be hydrophobic, in which case first component 120 is preferably hydrophobic while second component 122 is hydrophilic.

The first (120) and second (122) components are typically selected based on the choice of first layer 102. For example, if first layer 102 includes silicon nitride, first component 120 may be an acidic nitride derivative and second component 122 may be water. Alternatively, if first layer 102 includes an organo-metallic material, such as tetramethylsilane, first component 120 may include cellular fiber, carbon particles or carbon fibers, and second component 122 may include an alcohol.

When substrate 100 is heated sufficiently, for example, in a dry gas flow or low power plasma, as represented by arrows 124 in FIG. 1(*g*), second component 122 is removed from recessed surface portions 108 through evaporation. In addition, first component 120 dries to form second layers 126, each including the dried first component as a second material. After the heating step, second layers 126 remain attached or adhering to edge portions 112 of first layer 102 (FIG. 1(*h*)) due to the relatively strong chemical affinity between first layer 102 and second layers 126. Accordingly, cavities 128 are formed and defined by recessed surface portions 108 and second layers 126. As further shown in FIG. 1(*i*), a third layer 130, constituting a cap or protective layer and including an insulative material, such as silicon oxide or silicon nitride, is next formed over the first (102) and second (126) layers in a conventional manner to thereby complete device 140.

As noted above, cavity structures may be provided in capacitors to increase the capacitance thereof, consistent with a further aspect of the present invention. A process for fabricating an exemplary metal-insulator-metal (MIM) capacitor in accordance with an aspect of the present invention will next be described with reference to FIGS. 2(*a*)-2(*l*). As shown in FIG. 2(*a*), a first conductive layer 202 is deposited on a substrate 200 in a conventional manner. First conductive layer 202 may be any metal or conductive material suitable as a lower base metal electrode of the MIM capacitor. Examples of such conductive materials or metals include copper or an aluminum copper (AlCu) alloys. In FIG. 2(*b*), an insulative layer 204 including an oxide, e.g., silicon oxide, or a known inter-metal dielectric is next provided on substrate 204. A second conductive layer 206 is then provided on first insulative layer 204, and patterned in a conventional manner. Second conductive layer 206, which ultimately forms an upper metal electrode of the MIM capacitor, may be formed of the same metal or conductive material as first conductive layer 202.

As further shown in FIG. 2(*b*), an insulative layer 208 is deposited, and layers 206 and 208 are subject to chemical mechanical polishing (not shown) to yield a substantially planar surface, upon which a first layer 210 is deposited. First layer 210 is formed of a similar material and is deposited in a similar fashion as first layer 102 discussed above. Preferably, first layer 210 adheres to second conductive layer 206.

Next, in FIG. 2(*c*), a photoresist layer 212 is provided on first layer 210, and then patterned through a known photolithography step. An etching step, such as reactive ion etching, is then carried out, as represented by arrows 214 in FIG. 2(*d*) to remove portions of first layer 210, second conductive layer 206, insulative layer 204, and first conductive layer 202. As a result, recessed regions or cavities 216 are formed which extend through layers 210, 206, and 204 and into first conductive layer 202 (FIG. 2(*e*)). In FIG. 2(*f*), a fluid mixture 218 is next supplied to recessed regions 216. Fluid mixture 218 includes first (220) and second (222) components, which, as discussed above, separate due to their different chemical affinities to first layer 210. The substrate is then heated, as represented by arrows 224 in FIG. 2(*g*) so that, in a manner similar to that further discussed above with respect to FIG. 1(*g*), second component 222 is removed through evaporation (FIG. 2(*h*)). In addition, first component 220 dries to form second material layers, i.e., second layers 226, which remain attached to corresponding edge portions (e.g., edge portion 210-1) of first layer 210.

A third layer 230, typically including an insulative material, is next provided on first (210) and second (226) layers in FIG. 2(*i*). Third layer 230 preferably serves as a cap or protective layer. An additional protective layer 240 may also be formed on third layer 230. In FIG. 2(*j*), first (232) and second (234) vias are formed in layers 210, 230, and 240. First via 232 further extends through insulative layers 204 and 208 to first conductive layer 202, and second via 234 extends to second conductive layer 206. Third (236) and fourth (238) conductive layers are provided in vias 232 and 234, respectively. Third (236) and fourth (238) conductive layers are thus electrically coupled to first (202) and second (206) conductive layers, respectively.

Next, in FIG. 2(*k*), a photoresist layer 242 is provided on layer 240 and upper-most portions of conductive layers 236 and 238, and then patterned to expose portions of layer 240. The exposed portions of layer 240 and corresponding portions of layer 230 are then etched. Such etching also removes corresponding second layers 226 to provide access to cavities 216 through inlet opening 244 and outlet opening 246 (FIG. 2(*l*)). The exposed portions of layer 240 may be in a serpentine or other pattern such that, after etching, cavities 216 are interconnected in such a way as to permit the flow of fluid or gas therein. A dielectric fluid such as carbon fluoride may then be dispensed through a microtube 252, which may include, for example, a pipette. The dielectric fluid flowing into cavities 216 (represented by arrow 248) passes through inlet opening 244 to one of cavities 216. If cavities 216 are interconnected, the dielectric fluid can be supplied to each cavity through a single inlet opening 244. Excess dielectric fluid (as represented by arrow 250) flows out through outlet opening 246, which is in communication with a corresponding one of cavities 216. The completed MIM capacitor 260 is shown in FIG. 2(*l*).

The dielectric fluid discussed above may be either in liquid or gaseous form and may be a high-k dielectric fluid have a higher dielectric constant than that of insulative layer 208 or substrate 200. In addition, by using a liquid or gas dielectric fluid, flexible capacitor designs, which are not limited to conventional structures based on solid dielectric materials, can be achieved.

As further noted above, cavity structures consistent with the present invention may be also be implemented in a fuel cell. Such a fuel cell and related manufacturing method in accordance with further aspects of the present invention will next be described with reference to FIGS. 3(*a*)-(*t*).

In FIG. 3(*a*) a substrate 300 is provided which may include a plate coated with a layer of silicon oxide. An etch stop layer 302, including silicon nitride or other suitable etch resistant material is next deposited on substrate 300, followed by deposition of metal layer 304, which may include, for example, copper, silver, gold or platinum (FIG. 3(*b*)). A catalyst layer 306 for decomposing hydrogen in the completed fuel cell is next provided on metal layer 304. Catalyst layer 306 may include platinum, for example, if the underlying metal layer 304 is not previously formed of platinum.

Next, in FIG. 3(*d*), an additional etch stop layer 308, may be made of the same material as etch stop layer 302, is formed on catalyst layer 306, followed by successive depositions of glass layers 310-1 and 310-2. Glass layers 310-1 and 310-2 may include boro-phosphosilicate glass or phosphosilicate glass with a non-uniform doping profile. For example, the concentration of boron and/or phosphorus in glass layers 310-1 and 310-2 may increase from a lower portion to a top portion of each layer. Alternatively, the doping concentration may decrease from top to bottom within each layer. A cap or protective layer 312 is next formed on glass layer 310-2 (FIG. 3(*e*)).

In FIG. 3(*f*), a photoresist layer 316 is formed and patterned, and layers 312, 310-1, and 310-2 are etched by reactive ion etching or other suitable etching process, as represented by arrows 314. Layers 312, 310-1, and 310-2, patterned after such etching, are shown in FIG. 3(*g*).

First (319) and second (318) films are next deposited, as shown in FIG. 3(*h*). Films 318 and 319 are typically silicon oxide films deposited in a high density plasma (HDP) process. Films 318 and 319 are next masked by a patterned photoresist layer 322, which exposes a portion of cap layer 312. In FIG. 3(*i*), portions of cap layer 312, glass layers 310-1 and 310-2, etch stop layer 308, catalyst layer 306, and metal layer 304 are typically first anisotropically etched, by reactive ion etching, for example, and then subjected to an isotropic etch with a wet etchant such as hydrofluoric acid, such etching operations being represented by arrows 320. The anisotropic etch forms opening 328, and the isotropic etch further etches glass layers 310-1 and 310-2, but has little effect on layers 312, 308, 306, and 304 (FIG. 3(j)). Since, as noted above, the doping concentration within each of layers 310-1 and 310-2 is non-uniform, portions of the layers having less dopant etch at a different rate than those portions having a higher dopant concentration. Thus, some portions of layers 310-1 and 310-2 are etched through to adjacent films 318 and 319 while other portions remain substantially intact, such that the resulting layers 324 and 326 have a porous structure with a plurality of openings, such as openings 329.

Figures 3F, 3G:
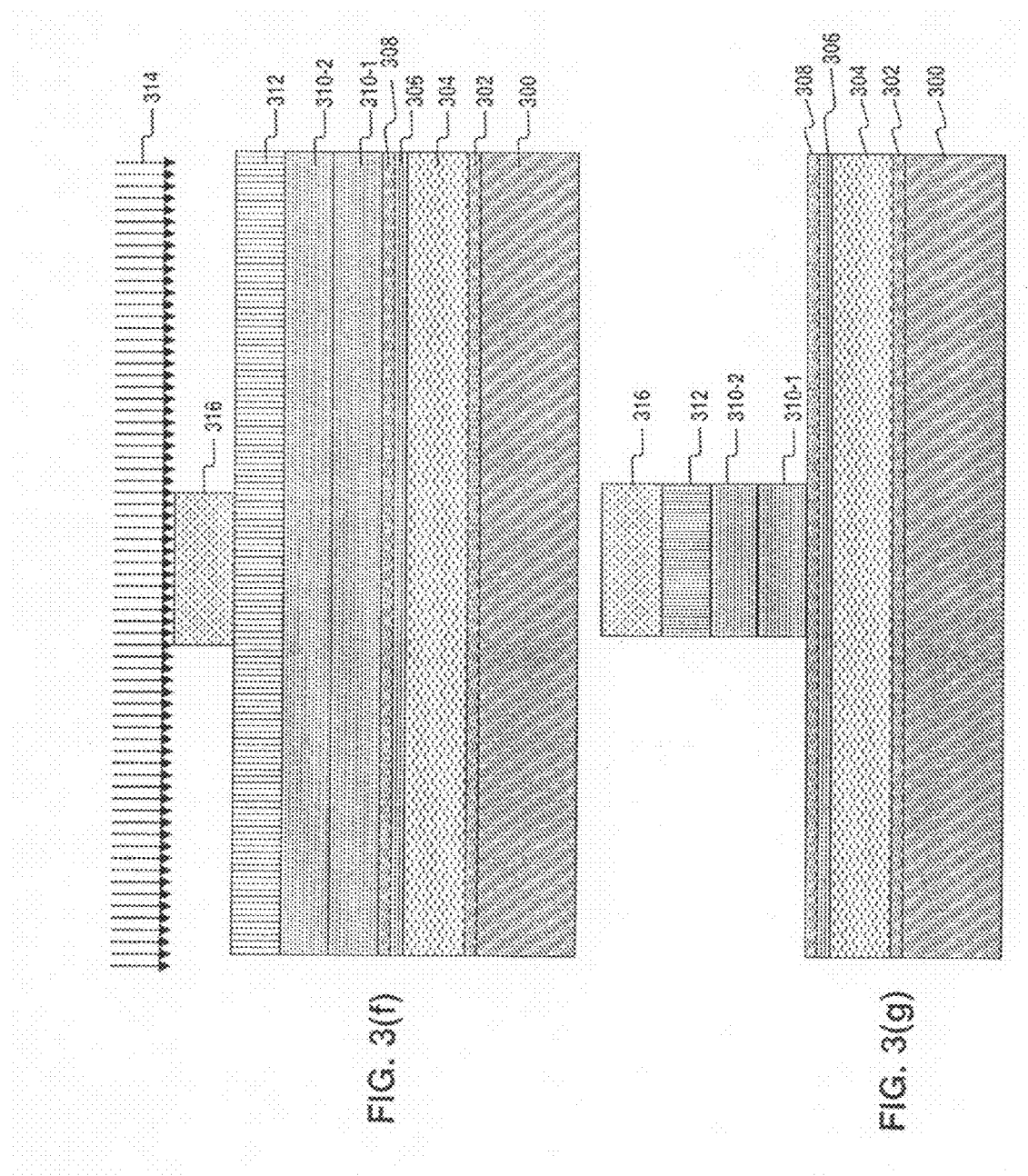
FIGS. 3(*a*)-3(*t*) illustrate process steps in manufacturing a fuel cell consistent with a further aspect of the present invention.
Figure 3H:
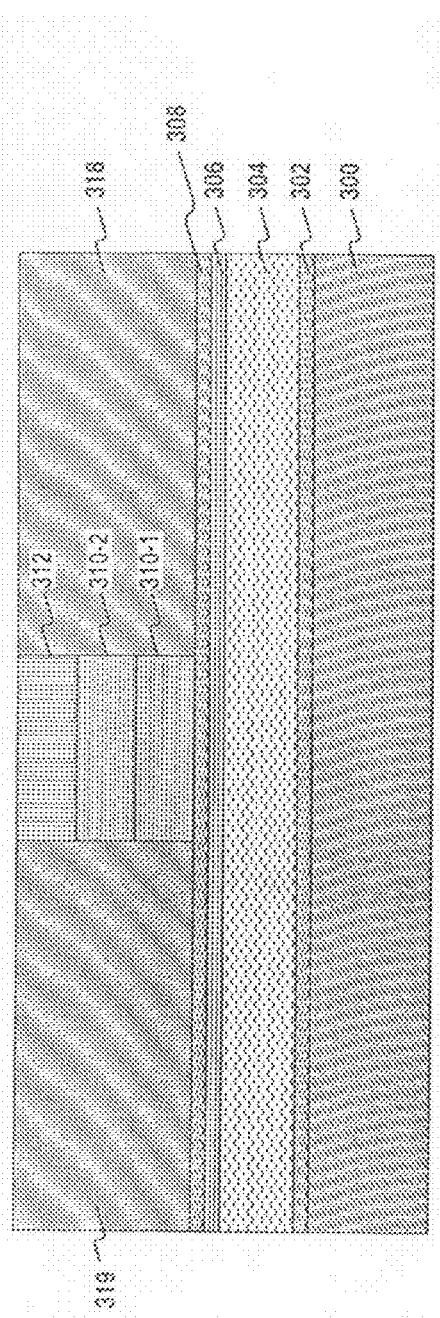
Figure 3I:
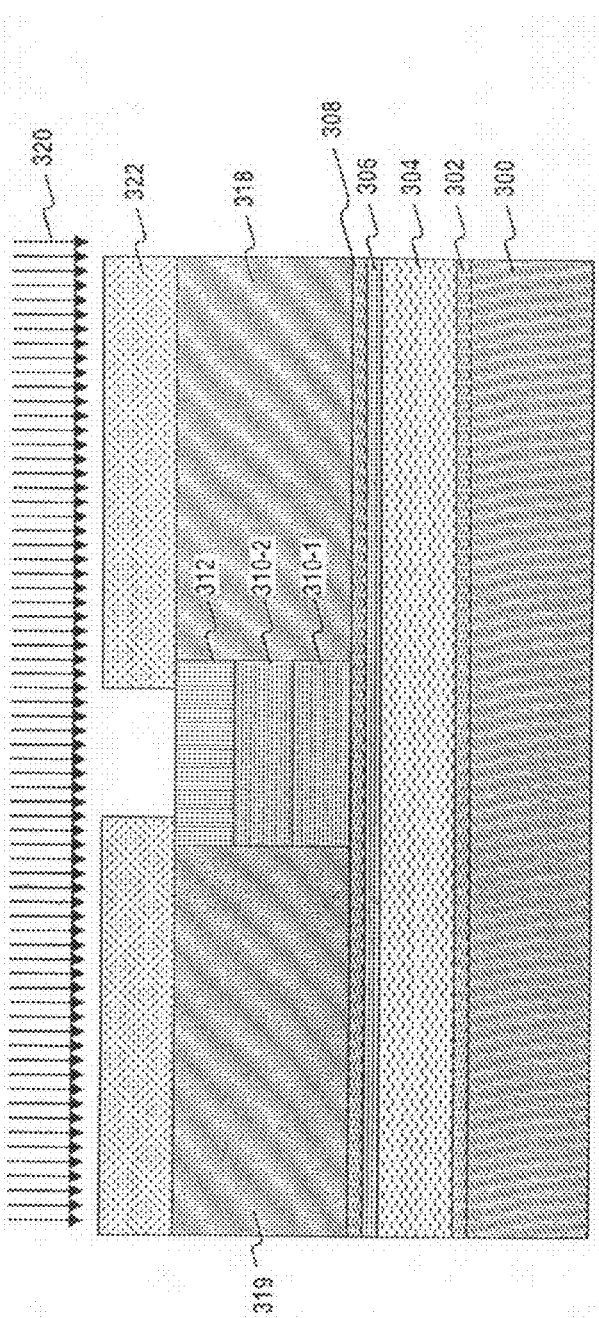

As further shown in FIG. 3(j), opening 328 divides metal layer 304 into an anode electrode 304-2 and a cathode electrode 304-1. Anode electrode 304-2 and cathode electrode 304-1 are provided over first (330) and second (332) portions, respectively, of substrate 300. A third portion 334 is provided beneath space 328 between first portion 330 and second portion 332.

In FIG. 3(k), a polymer electrolyte membrane (PEM) 336 is provided in opening 328. PEM 336 typically includes microscopic spheres in a gel suspension. The gel suspension may be mixed with water in order to fill opening 328, after which the gel may be dried.

A first layer 338 is next deposited on films 318 and 319, as well as PEM 336, as shown in FIG. 3(l). First layer 338 may include those materials that form first layer 102 discussed above. In FIG. 3(m), a photoresist layer 340 is provided on first layer 308 and patterned by conventional photolithography to expose portions of first layer 338, preferably in a serpentine or similar shape. Reactive ion etching or another conventional etching process, as represented by arrows 342, is carried out in FIG. 3(n) to remove portions of first layer 338, film 318, film 319, and etch stop layer 308. As a result, recessed regions 352, 354, 344, 346, 356, and 358 are formed (FIG. 3(o)), as well as patterned films 318-1 to 318-3, and 319-1 to 319-3. Preferably, these recessed regions are interconnected due to the patterning of the exposed portions of first layer 338. As further shown in FIG. 3(o), openings 348 and 350 expose portions of PEM 336 to first recessed region 344 and second recessed region 346, respectively.

In FIG. 3(p), a liquid mixture 364 is provided in recessed regions 352, 354, 344, 346, 356, and 358. Liquid mixture 364, like liquid mixture 318 discussed above, includes first (370) and second (368) components. First component 370 has a higher chemical affinity to first layer 338 than second component 368, and is thus drawn toward and adheres to first layer 338 in a manner similar to that discussed above in regard to first component 120. Next, in FIG. 3(q) heat is applied (as discussed above in connection with FIG. 1(g)), as represented by arrows 372, to dry second component 368 to form second layers 374 (FIG. 3(r)). Second layers 374 are similar to second layers 126 discussed above. As a result, second layers 374 adhere to corresponding edges of first layer 338. For example, an edge portion 374-1 of layer 374-a adheres to edge portion 338-a of layer portion 338-b, and edge portion 338-2 of layer portion 338-b (constituting a third layer) is adhered to by edge portion 374-2 of layer 374-b (constituting a fourth layer).

Figures 3R, 3S:
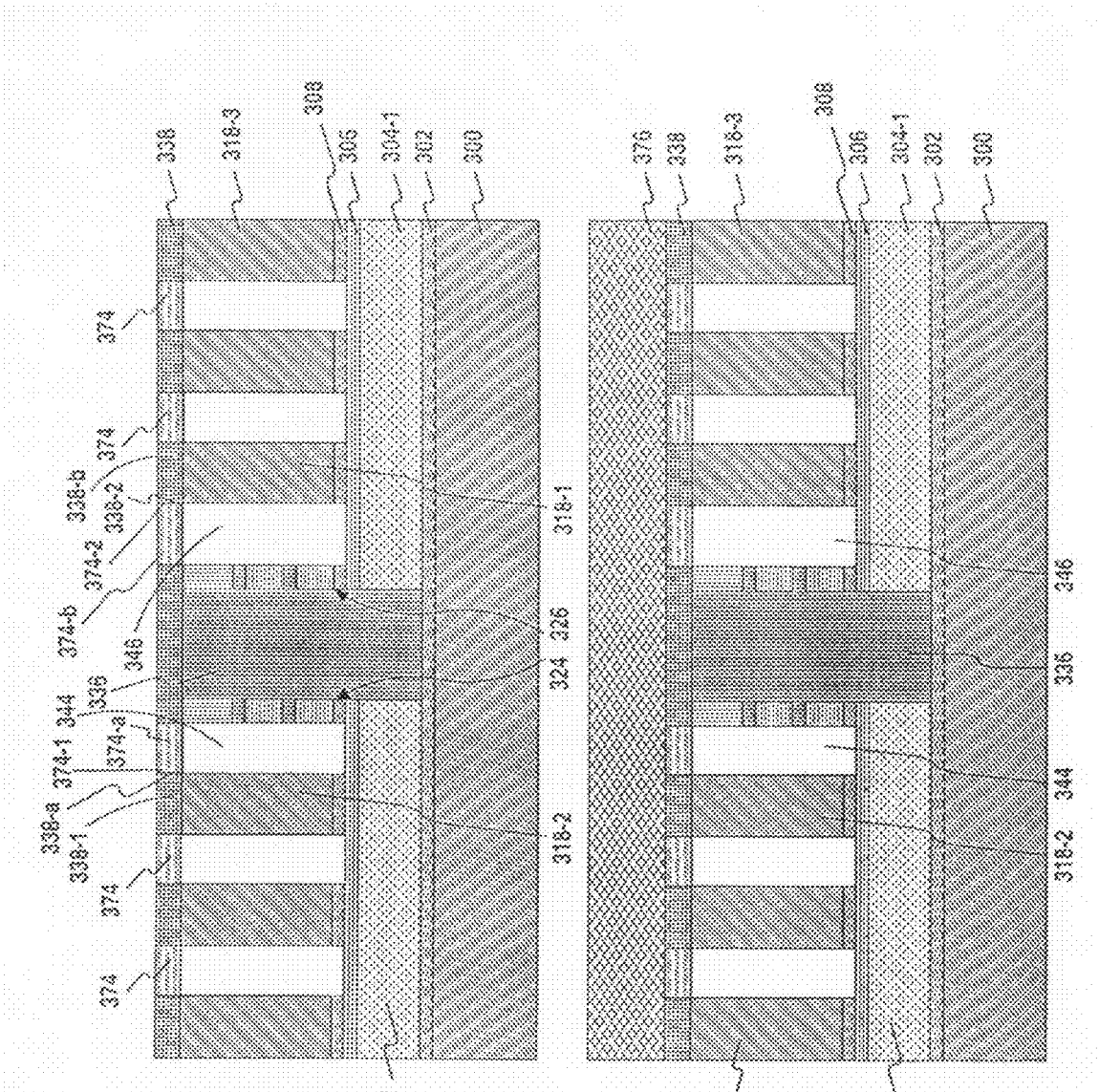
Figure 3T:
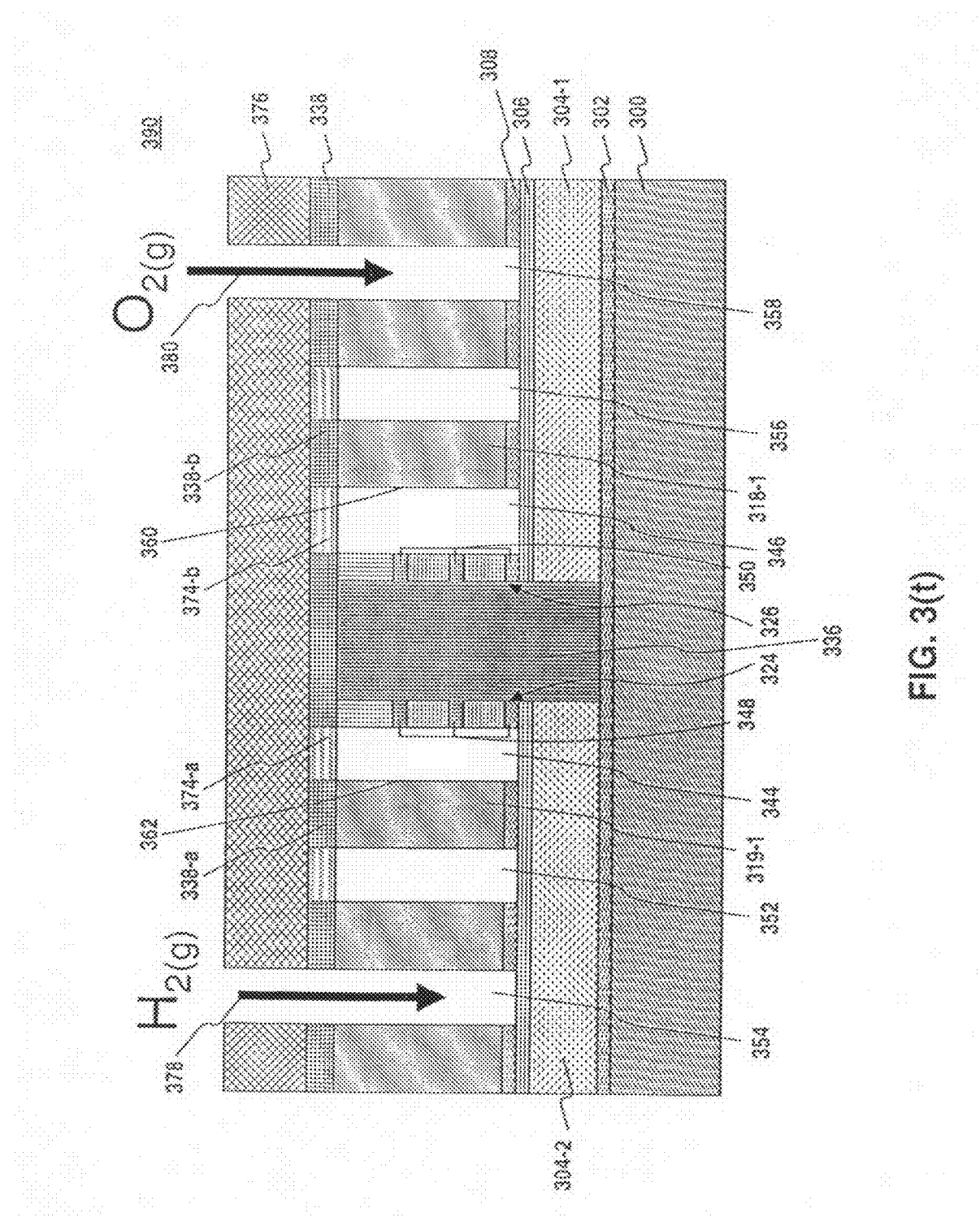

A cap or protective layer is next deposited as layer 376, which includes an insulative material (FIG. 3(s)). Lastly, in FIG. 3(t), openings are formed in third layer 376 to permit the flow of gaseous hydrogen ($H_2$, represented by arrow 378) into recessed region 352 and gaseous oxygen ($O_2$, represented by arrow 380) into recessed region 358. Preferably, recessed regions 346, 356, and 358 are interconnected, as noted above, and collectively constitute a groove, which confines and directs the oxygen to recessed region 346. Recessed region 346 is bounded or defined by sidewall 360 of film portion 318-1, second layer 374-b and porous layer 326. As noted above, openings 350 in porous layer 326 expose portions of PEM 336 to recessed region 346. Likewise, recessed region 344 is bounded or defined by sidewall 362, second layer 374-a, and porous layer 324. Openings 348 in porous layer 324 expose other portions of PEM 336 to recessed region 344. Completed fuel cell 390 is shown in FIG. 3(t).

In operation, hydrogen gas is supplied to regions of PEM 366 exposed by openings 348 in porous layer 324. Catalyst layer 306 adjacent porous layer 324 interacts with the hydrogen to yield protons and electrons. The protons migrate through openings 348 of porous layer 324, pass through PEM 336, and reach recessed region 346. Meanwhile, the electrons form an electrical current that flows from anode 304-2 to cathode 304-1. This electrical current flow has a corresponding voltage which can be used to drive a desired circuit (not shown). In recessed region 346, the electrons combine with the protons and the oxygen to form water, which can be removed by flushing additional oxygen gas, for example, through recessed region 346.

Fuel cell 390 may be manufactured using semiconductor processing techniques, such as photolithography, and thus can be made relatively small. Moreover, fuel cell 390 can be integrated onto a semiconductor chip so that the chip is self-powered, thereby obviating the need for an external power supply.

Figure 4:
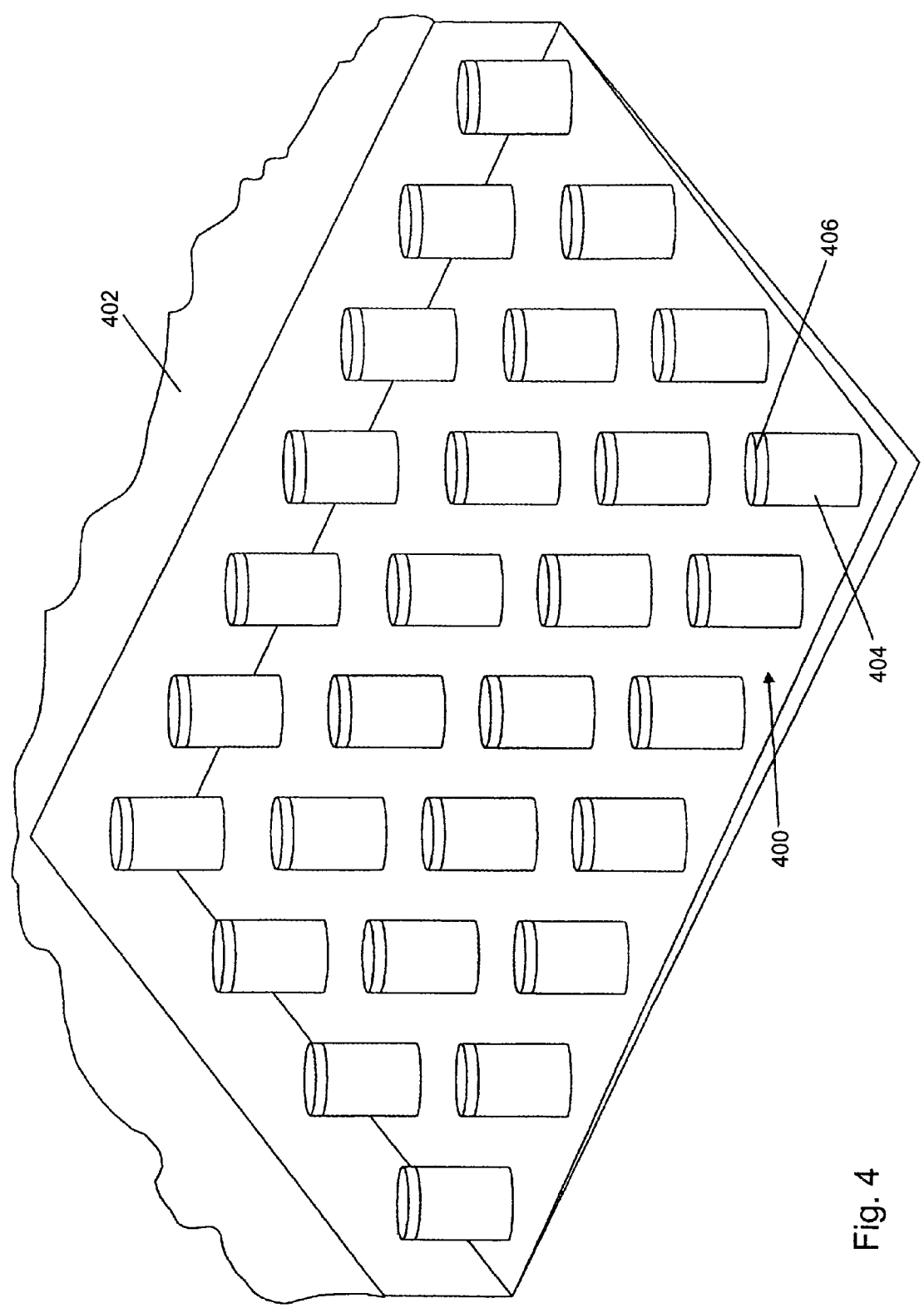
FIG. 4 is illustrates structures consistent with the present invention.

FIG. 4 illustrating exemplary structures consistent with the present invention. Namely, FIG. 4 shows a recessed surface portion 400 provided in a substrate 402. A plurality of protruding surface portions 404, made of silicon for example, are provided in the recessed surface portion 400, and a first layer 406 is provided on each protruding surface portion 404.

Although a hydrogen-based fuel cell is described above, other fuel cells are contemplated involving other input materials, such as methanol. Moreover, the cavity or recessed region structures discussed above are applicable to other devices in addition to capacitors and fuel cells.

Other embodiments of the invention will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. A method of making a device, comprising:
   providing a first layer on a surface of a substrate, the first layer including a first material;
   removing a portion of the first layer and a corresponding portion of the substrate to form an opening in the first layer and a recessed portion in the surface of the substrate;
   supplying a liquid mixture into the opening and the recessed portion, the liquid mixture including a first component having a first chemical affinity to the first material and a second component having a second chemical affinity to the first material, the first chemical affinity to the first material being greater than the second chemical affinity to the first material such that the first component separates from the second component and adheres to an edge portion of the first layer; and performing a heat treatment to remove the second component so as to leave the first component adhered to the edge portion of the first layer adjacent the opening in the first layer, wherein the first component adhered to the edge portion of the first layer forms a second layer, such that the second layer and the recessed portion define a cavity.

2. The method of claim 1, wherein the method further comprises providing a third layer over the second layer and the first layer.

3. The method of claim 1, wherein:
the first layer includes silicon nitride;
the first component includes an acidic nitride derivative; and
the second component includes water.

4. The method of claim 1, wherein:
the first layer includes an organo-metallic compound;
the first component includes carbon particles; and
the second component includes an alcohol.

5. The method of claim 4, wherein the organo-metallic compound includes tetramethylsilane.

* * * * *